United States Patent
Gunasekaran et al.

(10) Patent No.: US 11,856,063 B2
(45) Date of Patent: Dec. 26, 2023

(54) SYSTEMS AND METHODS FOR CLOUD SURVIVABILITY FOR CLOUD ORCHESTRATED INTERNET PROTOCOL SECURITY (IPSEC) SECURITY ASSOCIATIONS (SA)

(71) Applicant: HEWLETT PACKARD ENTERPRISE DEVELOPMENT LP, Houston, TX (US)

(72) Inventors: Gopalakrishnan Gunasekaran, Santa Clara, CA (US); Shreekanth Chandranna, Santa Clara, CA (US); Bhagvan Cheeyandira, Santa Clara, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

(21) Appl. No.: 17/220,812

(22) Filed: Apr. 1, 2021

(65) Prior Publication Data
US 2022/0321668 A1 Oct. 6, 2022

(51) Int. Cl.
*H04L 29/08* (2006.01)
*H04L 67/141* (2022.01)
*H04L 9/40* (2022.01)

(52) U.S. Cl.
CPC ........ *H04L 67/141* (2013.01); *H04L 63/0272* (2013.01); *H04L 63/0823* (2013.01); *H04L 63/164* (2013.01)

(58) Field of Classification Search
CPC ............... H04L 67/141; H04L 63/0272; H04L 63/0823; H04L 63/164
See application file for complete search history.

(56) References Cited

U.S. PATENT DOCUMENTS 8,537,715 B1 * 9/2013 Vadivelu ............... H04W 48/18
370/252
10,887,284 B1 * 1/2021 Hashmi ............... H04L 63/0272
(Continued)

OTHER PUBLICATIONS

Cisco Systems, Inc., "DHCP Tunnels Support," 2020, Dynamic Multipoint VPN Configuration Guide, Cisco IOS Release 15M&T, Chapter 10, pp. 149-156.
(Continued)

*Primary Examiner* — William J. Goodchild
(74) *Attorney, Agent, or Firm* — Sheppard Mullin Richter & Hampton LLP (57) ABSTRACT

Systems are methods are provided for implementing cloud survivability which mitigates the loss of secure communication via a cloud orchestrated IPsec tunnel, due to a loss of connectivity to a cloud service. For example, devices can establish IPsec tunnels which are orchestrated by a cloud service, such as SD-WAN Tunnel Orchestration. Then, according to the disclosed cloud survivability techniques, if the connection to the cloud service fails, a cloud survivability phase can be triggered which fails-over from IPsec tunnel to a survivability tunnel. In some implementations, a method includes: determining, by an initiator device, whether there is a loss of connectivity of the initiator device or the responder device with a cloud service. Further, in response to determining that there is a loss of connectivity, automatically establishing a survivability communication link between the initiator device and the responder device.

20 Claims, 5 Drawing Sheets

(56) References Cited

U.S. PATENT DOCUMENTS

2009/0288157 A1* 11/2009 Pacella .............. H04L 63/1441
726/12
2017/0094700 A1* 3/2017 Hong .................... H04W 48/18

OTHER PUBLICATIONS

Cisco Systems, Inc., "DMVPN Dynamic Tunnels Between Spokes Behind a NAT Device," 2020, Dynamic Multipoint VPN Configuration Guide, Cisco IOS Release 15M&T, Chapter 9, pp. 141-148.
Cisco Systems, Inc., "DMVPN Tunnel Health Monitoring and Recovery," 2020, Dynamic Multipoint VPN Configuration Guide, Cisco IOS Release 15M&T, Chapter 5, pp. 105-114.
Cisco Systems, Inc., "DMVPN-Tunnel Health Monitoring and Recovery Backup NHS," 2020, Dynamic Multipoint VPN Configuration Guide, Cisco IOS Release 15M&T, Chapter 6, pp. 115-114.
Cisco Systems, Inc., "Dynamic Multipoint VPN," 2020, Dynamic Multipoint VPN Configuration Guide, Cisco IOS Release 15M&T, Chapter 1, pp. 1-50.
Cisco Systems, Inc., "Sharing IPsec with Tunnel Protection," 2020, Dynamic Multipoint VPN Configuration Guide, Cisco IOS Release 15M&T, Chapter 11, pp. 157-174.

* cited by examiner

SYSTEMS AND METHODS FOR CLOUD SURVIVABILITY FOR CLOUD ORCHESTRATED INTERNET PROTOCOL SECURITY (IPSEC) SECURITY ASSOCIATIONS (SA)

DESCRIPTION OF RELATED ART

A virtual private network (VPN) extends a private network across public networks, and enables users to send and receive data across public networks as if the devices were directly connected on a private network. Applications running across the VPN may therefore benefit from the functionality, security, and management of the private network. VPN often utilizes Internet Protocol Security (IPsec). IPsec is a secure network protocol suite that can be employed to authenticate and encrypt packets of data, in order to provide secure encrypted communication between two computers over an Internet Protocol network.

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate the reader's understanding of various embodiments and shall not be considered limiting of the breadth, scope, or applicability of the present disclosure. It should be noted that for clarity and ease of illustration these drawings are not necessarily made to scale.

The figures are not intended to be exhaustive or to limit various embodiments to the precise form disclosed. It should be understood that various embodiments can be practiced with modification and alteration.

DETAILED DESCRIPTION

The systems and techniques disclosed herein are directed to enabling cloud survivability with respect to secure network communications, such as secure tunnels established via Internet Protocol Security (IPsec). Cloud survivability is often a concern with establishing (and maintaining) a secure connection between two computer devices communicating over an Internet Protocol (IP) network, and particularly with the use of IPsec. In accordance with the IPsec protocol, configured tunnels have a definite expiry time (e.g., default expiry time of 24 hours). During rekeying to maintain a tunnel in IPsec, if a connection to the cloud service (which provides new keys to maintain the tunnel) fails, then the current keys for the IPsec tunnel will expire. Thus, experiencing a cloud connectivity disruption (in turn causing an undesirable expiration of keys) can force the IPsec tunnels to go offline, and further resulting in network traffic disruption between the devices communicating via the IPsec tunnel. However, the cloud survivability techniques disclosed can help mitigate the loss of secure communication between devices, even if a connection to the cloud is lost. For example, devices can establish IPsec tunnels which are orchestrated by a cloud service, such as SD-WAN Tunnel Orchestration. Then, according to the disclosed cloud survivability techniques, if the connection to the cloud service fails for any reason, a cloud survivability phase can be triggered which fails-over from a cloud orchestrated tunnel (e.g., IPsec tunnel) to a the survivability tunnel (e.g., legacy IKE tunnel/cloud independent tunnel).

Figure 1:
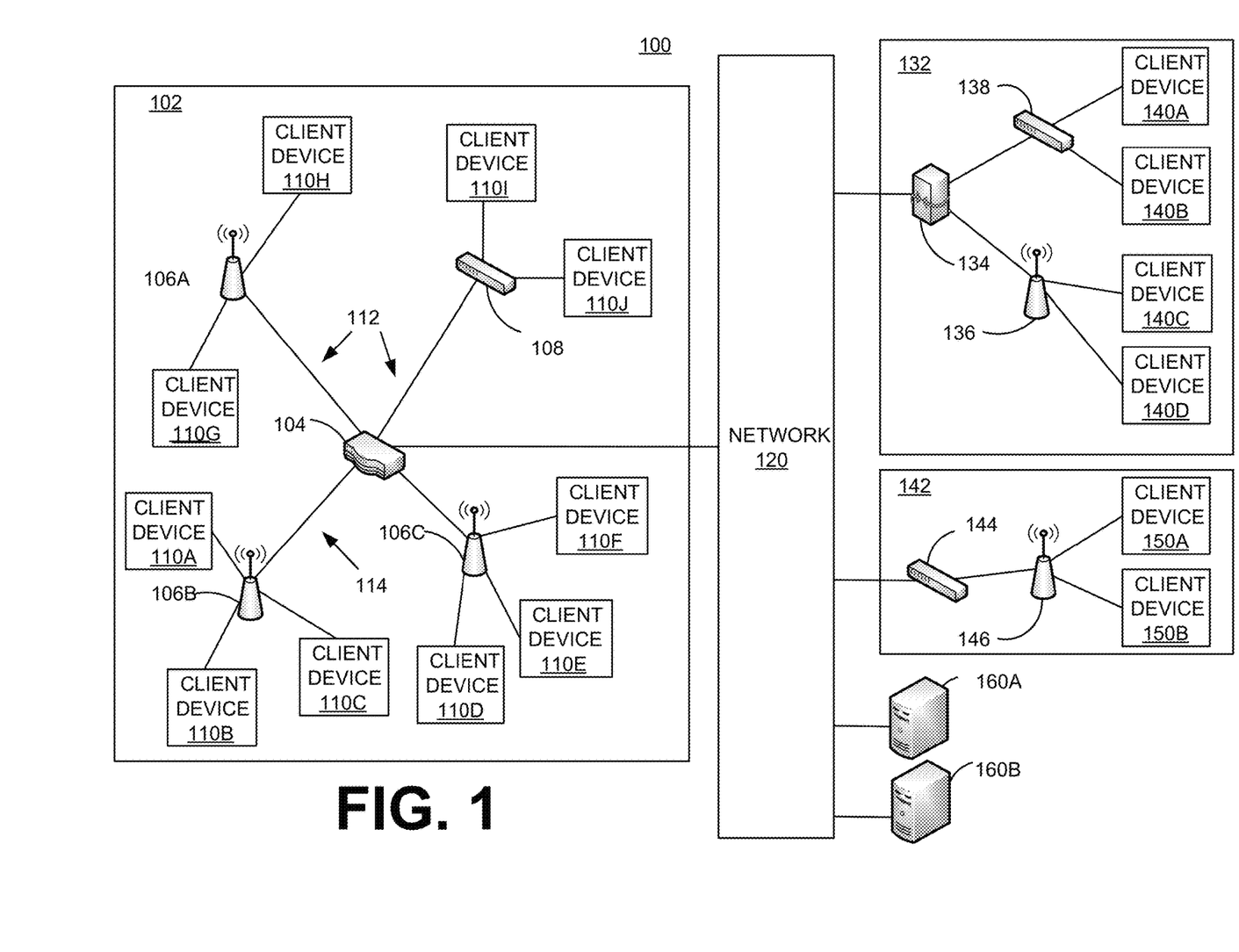
FIG. 1 illustrates an example networking environment in which Internet Protocol Security (IPsec) Security Associations (SAs) and the disclosed cloud survivability technology may be implemented.

Before describing embodiments of the disclosed cloud survivability systems and methods in detail, it is useful to describe an example network installation with which these systems and methods might be implemented in various applications. FIG. 1 illustrates one example of a network configuration 100 that may be implemented for an organization, such as a business, educational institution, governmental entity, healthcare facility or other organization. This diagram illustrates an example of a configuration implemented with an organization having multiple users (or at least multiple client devices 110) and possibly multiple physical or geographical sites 102, 132, 142. The network configuration 100 may include a primary site 102 in communication with a network 120. The network configuration 100 may also include one or more remote sites 132, 142, that are in communication with the network 120.

The primary site 102 may include a primary network, which can be, for example, an office network, home network or other network installation. The primary site 102 network may be a private network, such as a network that may include security and access controls to restrict access to authorized users of the private network. Authorized users may include, for example, employees of a company at primary site 102, residents of a house, customers at a business, and so on.

In the illustrated example, the primary site 102 includes a controller 104 in communication with the network 120. The controller 104 may provide communication with the network 120 for the primary site 102, though it may not be the only point of communication with the network 120 for the primary site 102. A single controller 104 is illustrated, though the primary site may include multiple controllers and/or multiple communication points with network 120. In some embodiments, the controller 104 communicates with the network 120 through a router (not illustrated). In other embodiments, the controller 104 provides router functionality to the devices in the primary site 102.

A controller 104 may be operable to configure and manage network devices, such as at the primary site 102, and may also manage network devices at the remote sites 132, 134. The controller 104 may be operable to configure and/or manage switches, routers, access points, and/or client devices connected to a network. The controller 104 may itself be, or provide the functionality of, an access point.

The controller 104 may be in communication with one or more switches 108 and/or wireless Access Points (Aps) 106a-c. Switches 108 and wireless APs 106a-c provide network connectivity to various client devices 110a-j. Using a connection to a switch 108 or AP 106a-c, a client device 110a-j may access network resources, including other devices on the (primary site 102) network and the network 120.

Examples of client devices may include: desktop computers, laptop computers, servers, web servers, authentication servers, authentication-authorization-accounting (AAA) servers, Domain Name System (DNS) servers, Dynamic Host Configuration Protocol (DHCP) servers, Internet Protocol (IP) servers, Virtual Private Network (VPN) servers, network policy servers, mainframes, tablet computers, e-readers, netbook computers, televisions and similar monitors (e.g., smart TVs), content receivers, set-top boxes, personal digital assistants (PDAs), mobile phones, smart phones, smart terminals, dumb terminals, virtual terminals, video game consoles, virtual assistants, Internet of Things (IOT) devices, and the like.

Within the primary site 102, a switch 108 is included as one example of a point of access to the network established in primary site 102 for wired client devices 110i-j. Client devices 110i-j may connect to the switch 108 and through the switch 108, may be able to access other devices within the network configuration 100. The client devices 110i-j may also be able to access the network 120, through the switch 108. The client devices 110i-j may communicate with the switch 108 over a wired 112 connection. In the illustrated example, the switch 108 communicates with the controller 104 over a wired 112 connection, though this connection may also be wireless.

Wireless APs 106a-c are included as another example of a point of access to the network established in primary site 102 for client devices 110a-h. Each of APs 106a-c may be a combination of hardware, software, and/or firmware that is configured to provide wireless network connectivity to wireless client devices 110a-h. In the illustrated example, APs 106a-c can be managed and configured by the controller 104. APs 106a-c communicate with the controller 104 and the network over connections 112, which may be either wired or wireless interfaces.

The network configuration 100 may include one or more remote sites 132. A remote site 132 may be located in a different physical or geographical location from the primary site 102. In some cases, the remote site 132 may be in the same geographical location, or possibly the same building, as the primary site 102, but lacks a direct connection to the network located within the primary site 102. Instead, remote site 132 may utilize a connection over a different network, e.g., network 120. A remote site 132 such as the one illustrated in FIG. 1 may be, for example, a satellite office, another floor or suite in a building, and so on. The remote site 132 may include a gateway device 134 for communicating with the network 120. A gateway device 134 may be a router, a digital-to-analog modem, a cable modem, a Digital Subscriber Line (DSL) modem, or some other network device configured to communicate to the network 120. The remote site 132 may also include a switch 138 and/or AP 136 in communication with the gateway device 134 over either wired or wireless connections. The switch 138 and AP 136 provide connectivity to the network for various client devices 140a-d.

In various embodiments, the remote site 132 may be in direct communication with primary site 102, such that client devices 140a-d at the remote site 132 access the network resources at the primary site 102 as if these clients devices 140a-d were located at the primary site 102. In such embodiments, the remote site 132 is managed by the controller 104 at the primary site 102, and the controller 104 provides the necessary connectivity, security, and accessibility that enable the remote site 132's communication with the primary site 102. Once connected to the primary site 102, the remote site 132 may function as a part of a private network provided by the primary site 102.

In various embodiments, the network configuration 100 may include one or more smaller remote sites 142, comprising only a gateway device 144 for communicating with the network 120 and a wireless AP 146, by which various client devices 150a-b access the network 120. Such a remote site 142 may represent, for example, an individual employee's home or a temporary remote office. The remote site 142 may also be in communication with the primary site 102, such that the client devices 150a-b at remote site 142 access network resources at the primary site 102 as if these client devices 150a-b were located at the primary site 102. The remote site 142 may be managed by the controller 104 at the primary site 102 to make this transparency possible. Once connected to the primary site 102, the remote site 142 may function as a part of a private network provided by the primary site 102.

The network 120 may be a public wide area network (WAN), such as the Internet, or other communication network to allow connectivity among the various sites 102, 130 to 142 as well as access to servers 160a-b. The network 120 may include third-party telecommunication lines, such as phone lines, broadcast coaxial cable, fiber optic cables, satellite communications, cellular communications, and the like. The network 120 may include any number of intermediate network devices, such as switches, routers, gateways, servers, and/or controllers, which are not directly part of the network configuration 100 but that facilitate communication between the various parts of the network configuration 100, and between the network configuration 100 and other network-connected entities. The network 120 may include various content servers 160a-b. Content servers 160a-b may include various providers of multimedia downloadable and/or streaming content, including audio, video, graphical, and/or text content, or any combination thereof. Examples of content servers 160a-b include, for example, web servers, streaming radio and video providers, and cable and satellite television providers. The client devices 110a-j, 140a-d, 150a-b may request and access the multimedia content provided by the content servers 160a-b.

In the example deployment shown in FIG. 1, the devices are connected via a WAN, namely network 120. It should be understood that the cloud survivability techniques can be used in deployment scenarios where the devices are Layer 3 or Layer 3 connected. As an example relating to FIG. 1, a case of an outage of network 120 could potentially cause a wide disruption to the network. As an example, if devices utilizing IPsec lose their connection to a cloud service via the network 120, this connectivity issue can cause IPsec keys to not be rekey-ed which can further lead to the associated IPsec tunnels being brought down. Such unintended and sporadic loss of tunnels, which provide secure communication for the devices on the network, can negatively impact the network implementations as a whole.

Figure 2:
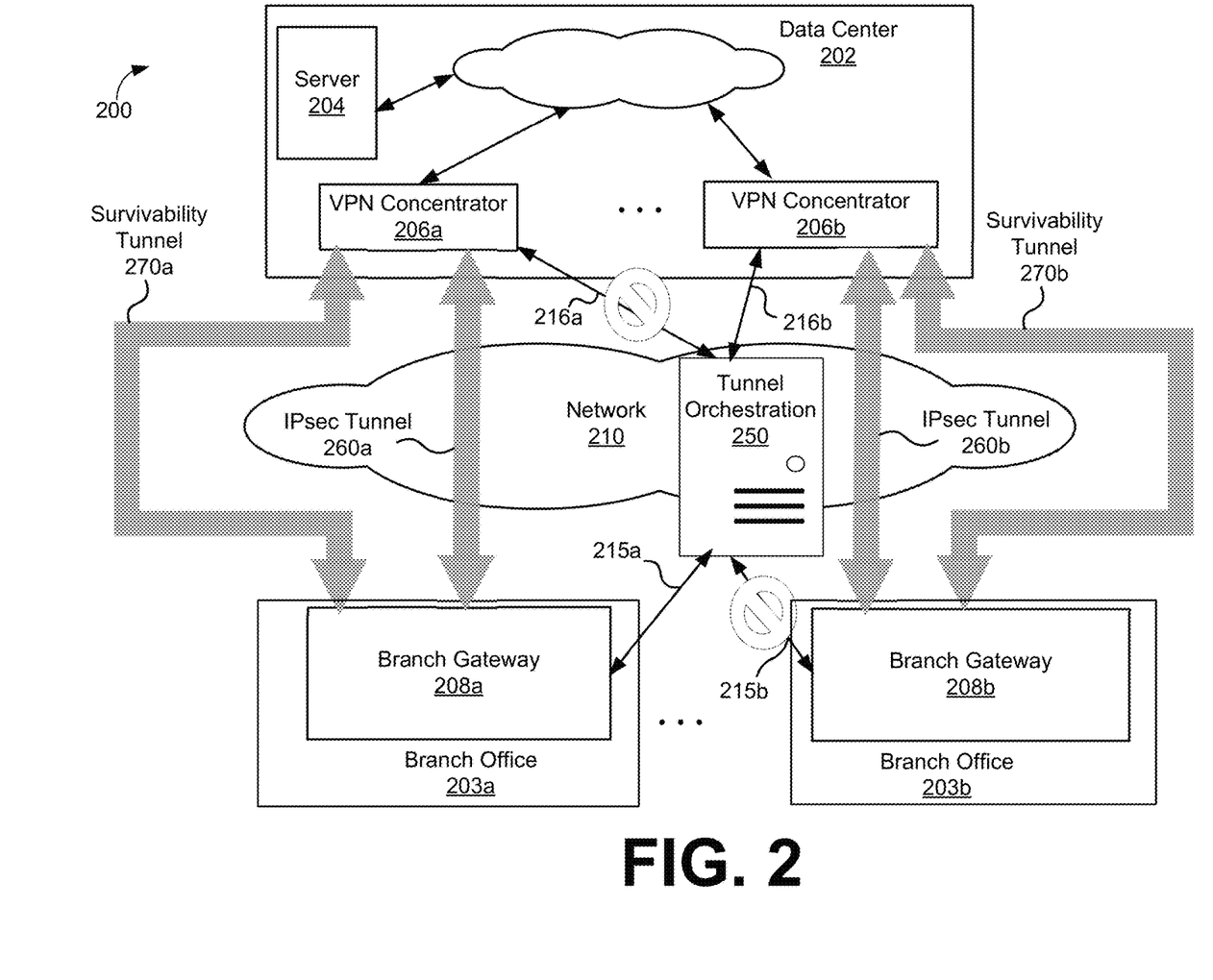
FIG. 2 illustrates an example for implementing the disclosed cloud survivability technology including establishing survivability tunnels as a failover for IPsec tunnels in a networking environment, in accordance with the disclosure.

Various embodiments of the disclosed cloud survivability technology are now described. In particular, FIG. 2 depicts an example of a network environment 200, for example a SD-WAN 200, in which the cloud survivability techniques can be implemented. The SD-WAN 200 can be designed to fully support applications hosted in on-premise data centers, shown as data centers 202 in FIG. 2. In the example, the SD-WAN 200 can have a topology that includes multiple branch offices 203a, 203b and a data centers 202 that are communicative connected by the communication network 210. The branch offices 203a, 203b may be located in different geographical locations, and being connected to data center 202 that is remotely distributed from the respective locations of the branch offices 203a, 203b. In the example, each of the branch offices 203a, 203b includes a respective branch gateways (BGs) 208a, 208b deployed thereon. Each of the BGs 208a, 208b can serve as an interface for incoming and/or outgoing traffic for its respective branch office 203a, 203b. For example, BG 208a can interface with uplink traffic from one or more client devices at branch office 203a that is routed to the communications network 210, and interface with downlink traffic from the communications network 210 to be directed to an appropriate one of the client devices of the branch office 203a.

Additionally, FIG. 2 illustrates that each of the data center 202 can have a cluster of VPN concentrators (VPNC) 206a,206b and a server 204 deployed thereon. Networking devices referred to as VPN concentrators (VPNC) 206a, 206b are employed to establish and configure tunnels, to authenticate users, to assign tunnels to users, to ensure delivery of the data flowing through the tunnels, and to encrypt and decrypt the data. For ease of deployment and management, VPN concentrators are often grouped in clusters, as illustrated in FIG. 2. In the example, data center 202a has a cluster including VPNCs 206a, 206b and server 206. It should be appreciated that the network configuration in FIG. 2 is an example and not intended to be limiting. For instance, a cluster can include any number of VPNCs as deemed necessary and/or appropriate.

FIG. 2 illustrates an example environment where IPsec may be used to provide a secure connection over network 210 (e.g., the Internet) between devices at the branch offices 203a, 203b which may be implemented as a private network. For example, branch office 203a may include a first local area network (LAN) or wide area network (WAN) served by a IPsec networking device, such as BG 208a, and branch office 203b may include a second LAN or WAN served by IPsec networking device, such as BG 208b.

According to the embodiments, the BGs 208a, 208b and the VPNCs 206a, 206b are implemented as IPsec networking devices. As used herein, the term "IPsec networking device" refers to a device on which an IPsec protocol operates. Other examples of IPsec network devices (where the IPsec protocol may operate) can include, but are not limited to: a router; a gateway, a switch; a firewall device; a server; a workstation; and the like. Thus, in operation, each of the BGs 208a, 208b can form an IPsec tunnel (e.g., VPN tunnel) with these VPNCs 206a, 206b in the cluster at the data center 202 via WAN uplink(s). In the illustrated example, a secure IPsec tunnel 260a can be formed between the BG 208a and the VPNC 206a; and another secure IPsec tunnel 260b can be formed between the BG 208b and the VPNC 206b.

In the example of FIG. 2, BG 208a and the VPNC 206a and BG 208b and the VPNC 206b are configured as IPsec peers to authenticate and initiate a secure connection through network 210, by initiating an IPsec data exchange to establish a connection including a secure IPsec tunnel 260. As part of IPsec data exchange process, incoming and outgoing security keys and IPsec SAs may be initialized and updated over time. IPsec networking devices may function to transparently process and route information from/to the branch offices 203a, 203b and from/to the data center 202, in accordance with an IPsec protocol. In some implementations, the environment of FIG. 2 may also implement pre-shared keys (PSK) or a certifying authority that may be used to avoid man in middle attacks or rouge nodes in the network.

Thus, IPsec may be used to build a virtual private network (VPN) for the remote sites across a network 210 that may be a public network (e.g., the Internet). It should be appreciated that implementations described herein do not need to be limited to the network topology illustrated in FIG. 2. For instance, in the enterprise context, IPsec may be implemented to provide remote-access VPN to individual user devices, to provide intranet VPNs to connect remote sites, and/or to provide extranet VPNs. In the case of remote-access VPN access being provided to a user device (e.g., user's laptop), the user device may itself contain a VPN client configured to run an IPsec application and it may function as an IPsec networking device in accordance with the disclosure.

Accordingly the IPsec tunnels 260a, 260b can establish a secure VPN over an otherwise unsecure (e.g., public) network 210, such as the Internet. While the embodiment of FIG. 2 is described as establishing IPsec tunnels with BGs, it should be understood that the disclosed technology may be employed to establish IPsec tunnels and cloud survivability with any network points capable of supporting that function, such as APs and controllers connected via Layer3 Network (as shown in FIG. 1).

For context, IPsec describes a secure network protocol suite of standards that use cryptography to secure communications over Internet Protocol (IP) networks. It may be used to authenticate endpoint hosts along with providing data confidentiality and integrity. IPsec may use the Internet Key Exchange (IKE) protocol to authenticate each peer in an IPsec session, negotiate security associations (SAs) between peers, and handle the exchange of session keys. IKE is a component of IPsec used for performing mutual authentication and establishing and maintaining SAs.

An IPsec data exchange between two peers may include five steps: i) initiating an IPsec session; ii) IKE Phase 1; iii) IKE Phase 2; iv) data transfer; and v) IPsec session termination. An IPsec session initiation (e.g., a VPN tunnel) may be triggered when network traffic is flagged for protection according to some IPsec security policy (SP) configured in IPsec peers. For example, network traffic determined to be of a particular type may be flagged for protection based on a security policy, whereas other traffic may travel normally through a public network. After session initiation, an IKE process may begin. During IKE phase 1, security parameters and keys required to establish an IKE security association (SA) may be negotiated. IKE phase one may include: authenticating identities of IPsec peers; the negotiation of a common IKE SA policy between peers to protect IKE exchange; a Diffie-Hellman (DH) key exchange for the creation of shared secret keys; and setting up a secure tunnel to negotiate IKE Phase 2 parameters.

During IKE phase 2, the two peers may negotiate a shared IPsec policy; and negotiate the security parameters and incoming/outgoing security keys required to establish two unidirectional IPsec SAs (e.g., one for incoming traffic and one for outgoing traffic). Thereafter, traffic may be exchanged during the IPsec session, with packets being encrypted/decrypted at peers using encryption specified in an IPsec SA. Additionally, traffic may be authenticated.

The devices at either end of an IPsec tunnel are considered IPsec peers. Referring back to the example in FIG. 2, BG 208a and VPNC 206a connected via IPsec tunnel 260a can be considered IPsec peers, and BG 208a and VPNC 206a connected via IPsec tunnel 260b can be considered IPsec peers. To build the IPsec tunnel, IPsec peers, for instance BG 208a and 206a, exchange a series of messages about encryption and authentication, and attempt to agree on many different parameters during the VPN negotiations process, as described in detail above. One device of the IPsec peers operates as the initiator in the negotiation sequence, and the other device is the responder. As an example, BGs 208a, 208b can be the initiators in their respective negotiations, while the VPNC 206a, 206b function as the responders.

According to some standards, IPsec SAs may be created with a finite lifetime (e.g., with respect to time or traffic volume). In order to assure interrupt-free traffic (e.g., traffic interrupted due to expired SAs) IPsec SAs have to be "rekeyed". As referred to herein, rekeying is the creation of new IPsec SAs to take the place of an expiring IPsec SA before the IPsec SA expires (e.g., ensuring minimal traffic loss). An initiator (e.g., BG 208a) and responder VPNC (e.g., 206a) can maintain both IPsec SAs for some duration during which they can receive (inbound) on both IPsec SAs. The inbound traffic on the old IPsec SA stops only after each node unambiguously knows that the peer is ready to start sending on the new SA (switch outbound to new SA).

In some implementations, the aforementioned rekeying of the IPsec SA's involve use of a cloud service. An example of such a cloud service is shown in FIG. 2 as a Tunnel Orchestration 250. The Tunnel Orchestration 250 can be a cloud micro-service that is particularly configured to support automatic configuration of IPsec tunnels, for instance the IPsec tunnels 260a, 260b between the BGs 208a, 208b and the VPNCs 206a, 206b. In some implementations, the Tunnel Orchestration 259 can negotiate keys for the IPsec networking devices, BG 208a, 208b and VPNC 206a, 206b and provide the keys directly to the devices for use. Additionally, the Tunnel Orchestration 250 can support rekeying, for instance by generating the new security keys associated with new IPsec SAs (replacing the expiring IPsec SAs). Subsequently, during rekeying, the new security keys can be communicated to the initiators (e.g., BGs 208a, 208b) and responders (VPNCs 206a, 206b). As previously described, once the cloud service pushes the new set of keys to both the Initiators (e.g., BGs 208a, 208b) and Responders (e.g., VPNCs 206a, 206b) the IPsec SAs can be set up. A separate pair of IPsec SAs are set up for AH and ESP transform. Each IPsec peer agrees to set up IPsec SAs, which consist of policy parameters to be used during the IPsec session. The IPsec's SAs are unidirectional for IPsec, such that an Initiator, for instance BG 208a, will offer the Responder, for instance VPNC 206a, a policy. If the Responder (e.g., VPNC 206a) accepts this policy, it will send that policy back to the Initiator (e.g., BG 208a). The negotiation establishes two one-way IPsec SAs between the IPsec peers, BG 208a and VPNC 206a. According to the IPsec standards, two-way communication consists of two IPsec SAs, that is one IPsec SA corresponding to each direction of communication.

FIG. 2 shows that the each of the BGs 208a, 208b and the VPNCs 206a, 206b use communication links that provide connectivity to the cloud service, namely Tunnel Orchestration 250. Particularly, BG 208a is connected to Tunnel Orchestration 250 via link 215a, and BG 208b is connected to Tunnel Orchestration 250 via link 215b. Similarly, the VPNC 206a, 206b have connectivity to the Tunnel Orchestration 250, as VPNC 206a is connected to Tunnel Orchestration 250 via link 216a, and VPNC 206b is connected to Tunnel Orchestration 250 via link 216b. Although communication links 215a, 215b, 216a, and 216b are illustrated in FIG. 2, in some embodiments the BGs 208a, 208b and VPNC 206a, 206b can use the same uplinks used to connect to network 210 (e.g., WAN) to also connect to the cloud service Tunnel Orchestration 250 as well.

Due to the cloud service (shown as Tunnel Orchestration 250) being necessary for the rekeying, and the rekeying required to appropriately maintain the IPsec tunnel, continued connectivity to the cloud service for the both the imitator and the responder can be critical. Regarding the example of the FIG. 2, the BGs 208a, 208b and the VPNC 206a, 206b need to maintain a connection to Tunnel Orchestration 250 for the IPsec tunnels 260a, 260b to be rekeyed (or provided new set of keys). Consequently, if the BGs 208a, 208b (e.g., initiators) or the VPNCs 206a, 206b (e.g., responders) experience a loss of connectivity to the Tunnel Orchestration 250, this can further cause wide disruption to the secure VPN communication, as IPsec keys are not being rekey-ed and IPsec tunnels 260a, 260b are brought down. In other words, without implementing the disclosed cloud survivability techniques, loss of connectivity to Tunnel Orchestration 250 on the network 210 (e.g., disruption to any of the communication links 215a, 215b, 216a, and 216b) can cause havoc to communication throughout the SD-WAN 200.

Also, FIG. 2 illustrates a distinct linking construct, namely survivability tunnels 270a, 270b, that is implemented by the cloud survivability techniques, as disclosed herein. As referred to herein, "survivability tunnels" can be considered a secure communication link between devices which is used as a fail-over in instances when loss of connectivity to the cloud also threatens the sustainability of IPsec tunnels. Survivability tunnels are an enhancement provided by the disclosed cloud survivability techniques, which allows devices to remain connected (vis-à-vis the survivability tunnel) even if the cloud connection fails for any reason. In other words, a key feature of the survivability tunnels is this linking mechanism can be established and maintained without requiring key-material to be continuality downloaded to the Initiator and Responder from the cloud service, which conversely is needed by the IPsec tunnels. According to the embodiments, both the Initiator (e.g., BGs 208a, 208b) and Responder (e.g., VPNCs 206a, 206b) can store the tunnel configuration data received from the Tunnel Orchestration 250 or other cloud service. Cloud services can establish IPsec tunnels based on a factory-cert authentication that can be performed between the cloud service and device. Thus, the disclosed techniques can leverage these aspects in order to implement the survivability tunnels 270a, 270b. That is, survivability tunnels can be established as legacy IKE/IPsec tunnels (e.g., not requiring connectivity to the cloud service), which are created by utilizing the factory-cert authentication as an authentication mechanism to ensure trust between the devices along with employing the tunnel configuration data already received from the cloud service. In some embodiments, a rekey expiry time that is associated with the survivability tunnels will be the same as last configuration received from cloud service.

After the IPsec tunnels 260a, 260b are initially established, the IPsec network devices, namely BGs 208a, 208b and VPNCs 206a, 206b will try to trigger a rekey-request before key expiry time of the previous configuration is received. In nominal operations (e.g., connectivity to the cloud service maintained), both the Initiator (e.g., BGs 206a, 206b) and the Responder (e.g., VPNC 206a, 206b) will receive the key-material from the Tunnel Orchestration 250 during rekeying, which allows the IPsec tunnels 260a, 260b to be maintained. However, in the case where connectivity to the cloud service is lost, at least one of the Initiators (e.g., BGs 208a, 208b) or the Responders (e.g., VPNCs 206a, 206b) become vulnerable to not receiving the necessary key-material from the Tunnel Orchestration 250. In turn, as the rekeying information is not received from the Tunnel Orchestration 250, then maintaining the IPsec tunnels 260a, 260b may be compromised. Currently, such a loss of connectivity to the cloud would cause the IPsec tunnels 260a, 260b to be brought down, thus disrupting communication between the BGs 208a, 208b and the VPNCs 206a, 206b. In contrast, the cloud survivability techniques discloses herein can initiate a survivability phase in the case where connectivity to the cloud service is interrupted, which allows the Initiators (e.g., BGs 208a, 208b) and the Responders (e.g., VPNCs 206a, 206b) to continue secure communications over a tunnel. In the example environment, when a connection to the Tunnel Orchestration 250 is detected to have gone down in a manner that threatens the viability of the IPsec tunnels 260a, 260b, the survivability techniques can establish the survivability tunnels 270a, 270b for use. By utilizing the survivability tunnels 270a, 270b, communication between the IPsec peers BGs 208a, 208b and the VPNCs 206a, 206b are moved away from the IPsec tunnels 260a, 260b that are in danger of being impacted by the loss of connection to the cloud and the Tunnel Orchestration 250.

In the example of FIG. 2, an Initiator, which is BG 208b, is shown to experience a loss of connectivity to the Tunnel Orchestration 250. A connection, such as communication link 215b, can be lost due to a plethora of causes, network failure, hardware failure, network performance and/or quality issues, and the like. As an example, the communication link 215b between the BG 208b and the Tunnel Orchestration 250 can be lost as a result of a cloud outage, when the cloud infrastructure service is unavailable for use. The cloud outage can also cause communication to nodes made available via the cloud, such as the communication link 215b to the Tunnel Orchestration 250, to be down during that time. As an aspect of the cloud survivability techniques, the Initiator, such as BG 208b, can detect when there is a loss of connectivity to the cloud service due to a cloud outage, for instance. In an embodiment, the BG 208b can detect that its connection 215b to the Tunnel Orchestration 250 on the network 210 has been interrupted (e.g., the device does not recognize the presence of communication link 215b). Additionally, the BG 208b can detect that further attempts to bring back the communication link 215b, or another connection to Tunnel Orchestration 250, has failed. In another embodiment, cloud connectivity loss may be determined when there is a failure to establish a new IPsec SA using the tunnel configuration provided by the cloud service before the current key expiry. In this scenario, receiving an improper tunnel configuration can be indicative of a failure or malfunctioning of the cloud service (as opposed to a cloud outage).

In the case of a Layer 3 network configuration, for instance employing Access Point (shown in FIG. 1), detecting cloud connectivity loss can be determined if there is no response received for any messages sent to the cloud service. As an example, the cloud survivability techniques can determine that there is cloud connectivity loss, when there is no response to a rekey request that has been communicated to the cloud service (within a specified amount of time).

Additionally, FIG. 2 illustrates an example where the communication link 216a between the VPNC 206a and the Tunnel Orchestrator 250 is down. In this example, as previously described, the VPNC 206a acts as the Responder. According to an aspect of the cloud survivability techniques, an Initiator can also detect whether their peer, namely the Responder, is experiencing a loss of connectivity to the cloud service (even if the Initiator continues to have connectivity to the cloud service). For instance, in this example, the Initiator (e.g., BG 208a) may successfully transmit a rekey request to the Tunnel Orchestration 250 via communication link 215a. Subsequently, BG 208a acting as the Initiator may receive the new key materials from the Tunnel Orchestration 250 in response. However, as alluded to above, VPNC 206a acting as the Responder will not have these same new key materials due to its loss of connectivity to the Tunnel Orchestration 250. Consequently, BG 208a will not be able to bring the IPsec tunnel 260a up, as both the Initiator (e.g., BG 208a) and Responder (e.g., VPNC 206a) needs to receive new key materials from the cloud service to bring up the tunnel. Therefore, in this scenario where the BG 208a has received the new key materials during rekeying, but fails to correspondingly bring up the IPsec tunnel 260a, this failure can serve as an indication to the Initiator (e.g., BG 208a) that the Responder (e.g., VPNC 206a) has lost their connection to the cloud service, namely Tunnel Orchestration 250. In other words, the disclosed cloud survivability techniques enable the Initiator to detect, or otherwise determine, whether the Responder of its IPsec peer has lost connectivity to the cloud service. According to the embodiments, survivability can be triggered when there is a loss of connectivity to the cloud service detected for the Initiator or Responder during rekeying.

After the loss of connectivity to the cloud service is detected, the cloud survivability can then trigger survivability, which establishes the survivability tunnels 270a, 270b. The survivability process can be performed at a set time period prior to the expiry of the current IPsec tunnel. Is some embodiments, the survivability process, including bringing up the survivability tunnels is executed at least 2 mins before the current IPsec tunnel expiry. Thus, in reference to the example environment of FIG. 2, at 2 minutes prior to expiration of the IPsec tunnel 260a the BG 208a acting as the Initiator can bring up the survivability tunnel 270a; and 2 minutes prior the expiration of the IPsec tunnel 260b the BG 208b acting as the Initiator can bring up the survivability tunnel 270b.

In order to establish the survivability tunnels 270a, 270b the cloud survivability techniques can involve creating an IKE tunnel config with the same transform set that was previously received from the cloud service (e.g., when connectivity to the cloud micro-service was available). Further, in order to authenticate the IPsec peers for use of the survivability tunnels, the cloud survivability techniques can configure the authentication method as factory cert. For example, the IPsec peers BG 208a (e.g., Initiator) and VPNC 206a (e.g., Responder) and BG 208b (e.g., Initiator) and VPNC 206b (e.g., Responder) can be authenticated with cert-based authentication. Subsequently, after performing cert-based authentication of the IPsec peers, the cloud survivability techniques can initiate IKE phase-1 and phase-2 to bring up the survivability tunnels for use. Referring to FIG. 1, the BG 208a (e.g., Initiator) and VPNC 206a (e.g., Responder) and BG 208b (e.g., Initiator) and VPNC 206b (e.g., Responder) can trigger legacy IKE phase-1 and phase-2 of VPN negotiations, as described in detail above, which creates the survivability tunnels 270a, 270b respectively. In the case that a survivability tunnel fails to be established after a first attempt, the cloud survivability techniques can restart the process again in an iterative manner, until the survivability tunnel is successfully established. As a result, the cloud survivability techniques, as disclosed herein, can provide increased reliability, ensuring that a cloud survivability is properly brought up to support the switch-over from compromised IPsec tunnels.

After the survivability tunnels 270a, 270b are fully established, the BG 208a and VPNC 206a and the BG 208b and the VPNC 206a continue to securely communicate begin to use the survivability tunnels 270a, 270b as a form of back-up tunnels to the IPsec tunnels. For example, BG 208a and VPNC 206a can fail-over from communicating over IPsec tunnel 260a, and re-establish their secure communication over the survivability tunnel 270a, as if these IPsec peers were still using the IPsec tunnel 260a. Consequently, the disclose cloud survivability techniques provide an enhancement to current IPsec technology, which circumvents the impact of a cloud service outage. That is, the disclosed cloud survivability process automatically triggers the creation of survivability tunnels for fail-over from the IPsec tunnels which may be undesirably interrupted as a consequence of lost connectivity to the cloud service.

Figure 3:
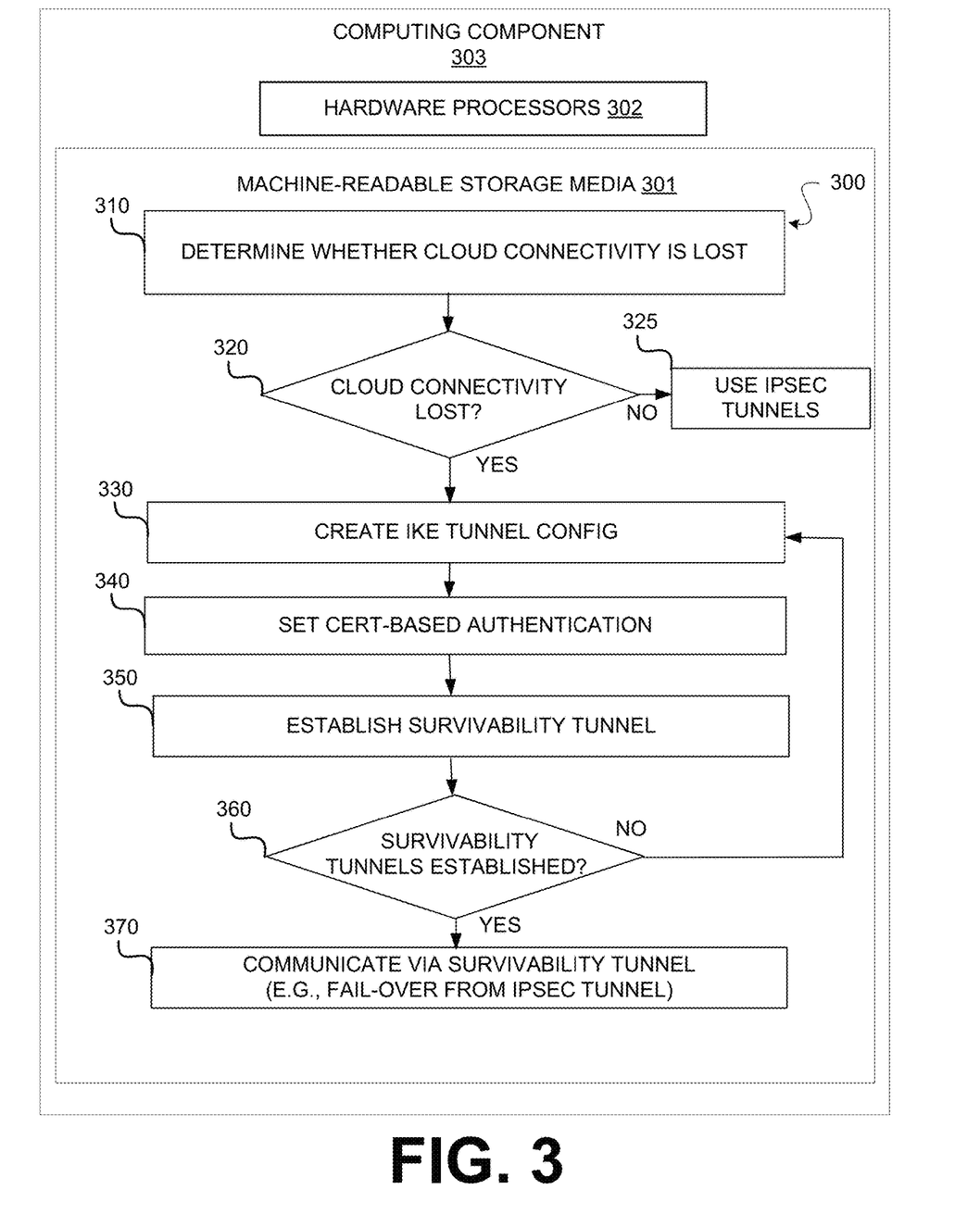
FIG. 3 is an operational flow diagram illustrating an example method for implementing the disclosed cloud survivability technology, in accordance with implementations of the disclosure.

FIG. 3 is an operational flow diagram illustrating an example method 300 that may be implemented by a IPsec networking device to implement the cloud survivability techniques, in accordance with implementations. The process 300 is illustrated as a series of executable operations in a machine-readable storage media 301 performed by a hardware processor 302. The computing component 303 can be a computer device that is an IPsec networking device, such as an AP (shown in FIG. 1) or a gateway (shown in FIG. 2), as previously described.

With specific reference now to the operations of the illustrated method, the process can begin at operation 310. At operation 310, it can be determined whether there is loss of connectivity to a cloud device. As alluded to above, IPsec tunnels are configured to be brought up for a designated amount of time. Before a current IPsec tunnel expires, the IPsec peers at respective ends of the IPsec tunnels participate in a rekeying process. During rekeying, each IPsec peer receives new key material from the cloud service for establishing the new IPsec SA (in order to maintain the tunnel for continued use). In some embodiments, it at the set time for rekeying of an associated IPsec tunnel, where one of the IPsec peer devices can detect if there is a loss of connectivity to the cloud service. As an example, a cloud/network outage can be the root cause of an IPsec network device losing its connectivity to the cloud service. According to some embodiments, an IPsec network device acting as the Initiator can perform the determination at operation 310. Detecting connectivity loss in operation 310 can involve determining whether at least one of the Initiator or the Responder of the IPsec peers has lost their connection to the cloud service.

In order to perform operation 310, an IPsec network device implementing the cloud survivability techniques can detect connection loss using various mechanisms, including, but not limited to: detecting loss of a physical communication link to the cloud service, and failed attempts to re-establish the communication link; detecting no response from the cloud service (e.g., for all the message sent by the devices); detecting a failure to establish a new cloud IPsec SA using tunnel config provided by the cloud service before the current key expiry; detecting a failure to bring up the IPsec tunnel (e.g., indication that the Responder has lost connectivity to the cloud service).

Next, at operation 320, a conditional check can be performed in order to trigger the survivability actions of the process 300, if there is a detected loss of connectivity. That is, the result from previous operation 310 can be used to satisfy the check 320, which identifies whether or not an IPsec peer is experiencing connectivity loss to the cloud service. For example, if operation 310 determines that there has been no response received from the cloud service (e.g., after a determine period of time), then at operation 320 the check signifies there is indeed a loss of connectivity, which can potentially cause the current IPsec tunnel to be lost unexpectedly. As a result of identifying the connectivity loss (shown as "Yes" in FIG. 3), operation 320 initiates the survivability and proceeds to operation 330. Alternatively, if there is no identified loss of connectivity to the cloud service (shown as "No" in FIG. 3), this indicates that the Initiator and the Responder should both receive the new key material from the cloud service (as expected in nominal IPsec negotiations). In this scenario, as there are no interruptions to the cloud service connections, rekeying should be successful and there is a low potential for the IPsec tunnels to be lost. Thus, the process 300 continues to operation 325 where the IPsec peers can continue to use the current IPsec tunnels, after rekeying, for secure communications.

Referring back to operation 330, the process 300 begins the survivability phase of the method, based on detecting that there has been loss of connectivity to the cloud service (either the Initiator or the Responder). As alluded to above, such a loss can compromise the IPsec SA during rekeying and thus impact the ability to maintain the current IPsec tunnel. By triggering the survivability phase, the process 300 can automatically execute a fail-over to the survivability tunnel (e.g., configured as legacy IKE/IPsec tunnels that does not require the cloud service) that is brought up as a form of back-up to the IPsec tunnel that may be lost (e.g., due to the inability to complete rekeying during connectivity loss). As an example, the survivability phase of process 300 can be triggered at the last 2 min mark (e.g., post the last rekey config received or after probe failures), for instance after 8 rekey attempts, if the IPsec tunnel is not formed. In the case where the Initiator triggers the survivability phase, the Responder receives this trigger from the Initiator for survivability tunnel establishment.

At operation 330, an IKE tunnel configuration is created. As previously mentioned, the survivability tunnel can be configured as a legacy IKE/IPsec tunnel. Thus, the IKE configuration created in operation 330 can be ultimately applied in creating, or bringing up, the IPsec tunnel. According to the embodiments, the IKE configuration can be the same transform set that was previously received from the cloud service (e.g., from the last successful rekeying when connectivity to the cloud service was available).

Thereafter, at process 340, the method used for performing negotiation between the IPsec peer can be set to factory cert. In other words, the negotiation between IPsec peers is adapted from the authentication method applied with cloud orchestration (which requires connectivity to the cloud service), and enables the devices to use cert-based authentication (which does not require connectivity to the cloud service) in order to bring up the survivability tunnel. The Responder can authenticate the Initiator using factory cert provided by the user. The IPsec peers will be first checked using the IPsec config received from the cloud service. After the authentication method has been set to factory cert, the process 300 can continue to 350.

Operation 350 establishes the survivability tunnel, based on the configurations set in previous operations 340 and 330. Operation 350 can involve performing IKE phase 1 and phase 2 of IPsec negotiation, as described in greater detail above. That is, operation 350 performs the legacy IKE process for tunnel config using the factory cert-authentication set up in previous operation 340. As a general description, Phase 1 sets up a secure encrypted channel through which the two peers can negotiate Phase 2. When Phase 1 finishes successfully, the IPsec peers can move on to Phase 2 negotiations. Phase 2 negotiations allows the two peers to agree on IPsec SA. The Phase 1 and Phase 2 configurations must match for the devices on either end of the tunnel, then the survivability tunnel can be brought up.

Next, operation 360 performs a conditional check to determine whether the survivability tunnel was successfully established. Operation 360 is a mechanism which ensures that the survivability phase has brought up the survivability tunnel in a manner that allows the IPsec peers to switch over from the IPsec tunnel for communication. For example, if there was an issue during Phase 1 or Phase 2 executed in previous operation 360, and the survivability was not successfully brought up (shown as "No" in FIG. 3), the process 300 can return to operation 330 and re-attempt to establish the survivability tunnel. According to some embodiments, the process 300 can execute operations 330-350 in an iterative manner (for a specific number of times), and continues to try to bring up the survivability tunnel until it is successful. Alternatively, if it is determined that the survivability tunnel was successfully brought up in operation 360 (shown as "Yes" in FIG. 3), then the process 300 moves to operation 370.

Thereafter, at operation 370, with the survivability tunnel available, the IPsec peers can fail-over from the IPsec tunnel and communicate via the survivability tunnel. Accordingly, the survivability tunnel will be used to pass traffic between the IPsec peers (e.g., Initiator and Responder). Process 300 allows IPsec networking devices to continue secure communications via the survivability tunnel, even if the IPsec tunnel (e.g., based on cloud orchestration) is disrupted by the loss in connectivity to the cloud service. According to the some embodiments, during the next rekey, communication can be switched back to the cloud orchestrated IPsec tunnel if the previously lost cloud connectivity has been re-established. In some embodiments, if the cloud service sends any new key config during the survivability phase of process 300, the Responder can respond and create a bootstrap tunnel along with the existing tunnel (e.g., survivability tunnel).

Figure 4:
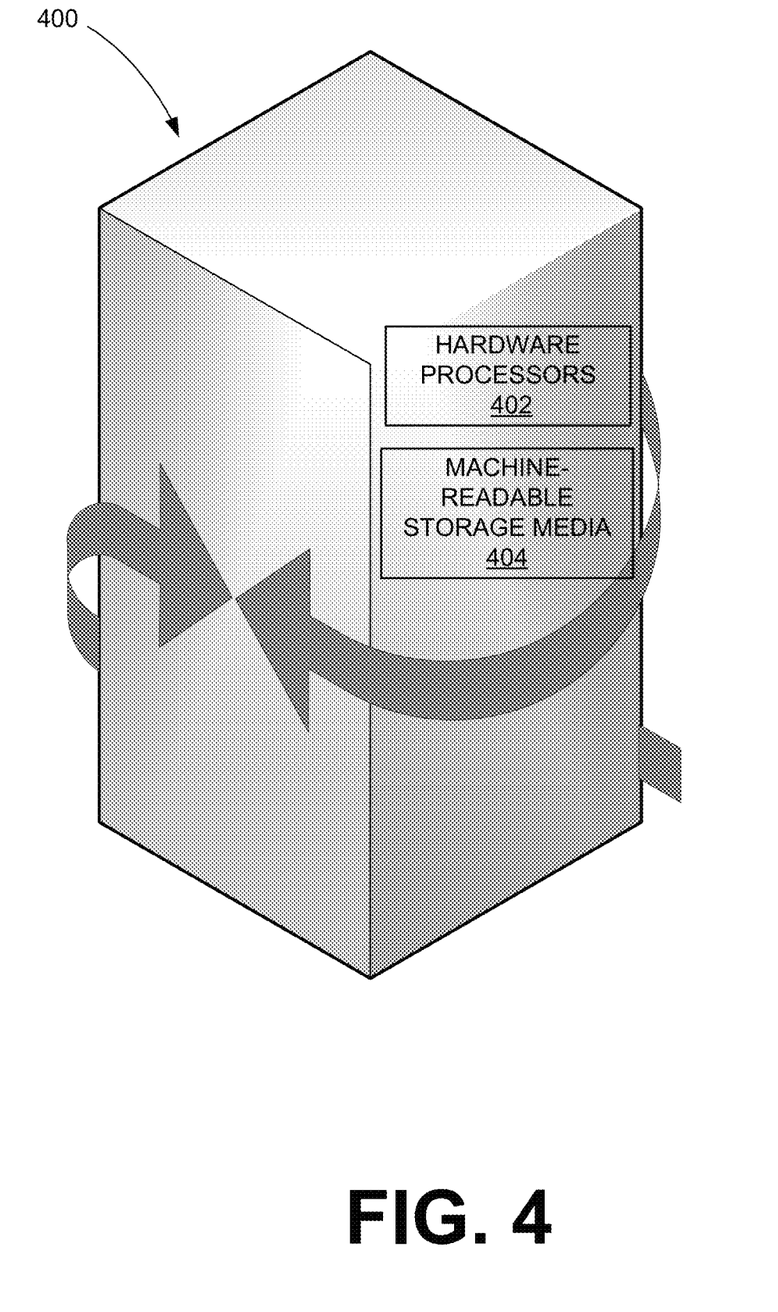
FIG. 4 is a block diagram of an example computing component or IPsec networking device for implementing the disclosed cloud survivability technology including establishing survivability tunnels, in accordance with one embodiment.

FIG. 4 is a block diagram of an example computing component 400 or IPsec networking device, such as a branch gateway or VPNC (shown in FIG. 3) for implementing the cloud survivability techniques in accordance with an embodiment. In some implementations, the computing component 400 can be an initiator of IPsec peers, where the computing component 400 is communicatively coupled to another IP networking device via an IPsec tunnel. The computing component 400 may include a hardware processor 402 and machine-readable storage medium 404. Hardware processor 402 may execute instruction 406 to perform the functions of cloud survivability, such as establishing a cloud survivability tunnel that can be used as a failsafe to an IPsec tunnel. For example, the machine-readable storage medium 404 can implement the cloud survivability method shown in FIG. 3. Accordingly, the hardware processor 402 of the computing component can be programmed to: determine whether it has lost connectivity with the cloud service through a communication network or whether its IPsec peer has lost connectivity with the cloud service through the communication network; and in response to determining that there is a loss of connectivity, automatically establish a survivability tunnel.

Figure 5:
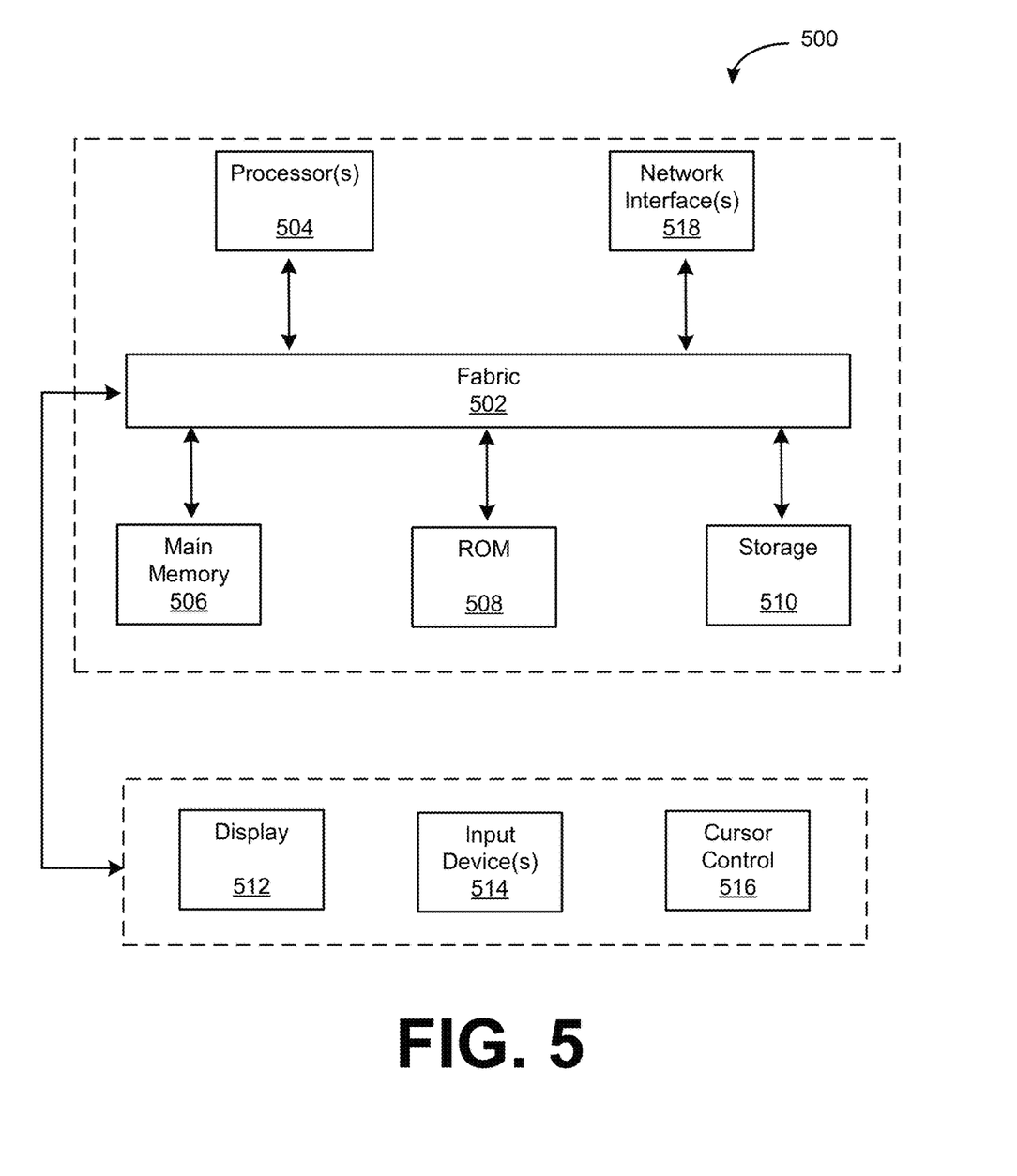
FIG. 5 depicts a block diagram of an example computer system in which various of the embodiments described herein may be implemented.

FIG. 5 depicts a block diagram of an example computer system 500 in which the cloud survivability techniques described herein may be implemented. For example, the computer system 500 may be an IPsec networking device, such as an AP (shown in FIG. 1) or gateway (shown in FIG. 2), as described in detail above. The computer system 500 includes a fabric 502 or other communication mechanism for communicating information, one or more hardware processors 504 coupled with fabric 502 for processing information. Hardware processor(s) 504 may be, for example, one or more general purpose microprocessors.

The computer system 500 also includes a main memory 506, such as a random-access memory (RAM), cache and/or other dynamic storage devices, coupled to fabric 502 for storing information and instructions to be executed by processor 504. Main memory 506 also may be used for storing temporary variables or other intermediate information during execution of instructions to be executed by processor 504. Such instructions, when stored in storage media accessible to processor 504, render computer system 500 into a special-purpose machine that is customized to perform the operations specified in the instructions.

The computer system 500 further includes storage devices 510 such as a read only memory (ROM) or other static storage device coupled to fabric 502 for storing static information and instructions for processor 504. A storage device 510, such as a magnetic disk, optical disk, or USB thumb drive (Flash drive), etc., is provided and coupled to fabric 502 for storing information and instructions.

The computer system 500 may be coupled via fabric 502 to a display 512, such as a liquid crystal display (LCD) (or touch screen), for displaying information to a computer user. An input device 514, including alphanumeric and other keys, is coupled to fabric 502 for communicating information and command selections to processor 504. Another type of user input device is cursor control 516, such as a mouse, a trackball, or cursor direction keys for communicating direction information and command selections to processor 504 and for controlling cursor movement on display 512. In some embodiments, the same direction information and command selections as cursor control may be implemented via receiving touches on a touch screen without a cursor.

The computing system 500 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "engine," "system," "database," data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor(s) 504 executing one or more sequences of one or more instructions contained in main memory 506. Such instructions may be read into main memory 506 from another storage medium, such as storage device 510. Execution of the sequences of instructions contained in main memory 506 causes processor(s) 504 to perform the process steps described herein. In alternative embodiments, hardwired circuitry may be used in place of or in combination with software instructions.

As used herein, a circuit might be implemented utilizing any form of hardware, software, or a combination thereof. For example, one or more processors, controllers, ASICs, PLAs, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 500.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A method comprising:
   establishing, by an initiator device, an encrypted tunnel between the initiator device and a responder device of a cloud service based on a set of parameters obtained from the cloud service;
   determining, by the initiator device, whether there is a loss of connectivity to the cloud service from the initiator device or the responder device, wherein the cloud service supports respective communication links to the responder device and the initiator device via a network associated with the cloud service;
   in response to determining the loss of connectivity due to not receiving a response from the cloud service for a message sent from the initiator device or the responder device for a rekeying of the encrypted tunnel, establishing, by the initiator device using the set of parameters of the encrypted tunnel, a survivability tunnel between the initiator device and the responder device bypassing the network; and
   in response to determining that the survivability tunnel is successfully established, communicatively coupling the initiator device and the responder device via the survivability tunnel as a failsafe to the encrypted tunnel.

2. The method of claim 1, wherein the encrypted tunnel is a cloud-based Internet Protocol Security (IPsec) tunnel established via the cloud service.

3. The method of claim 1, wherein the survivability tunnel is a legacy IPsec tunnel established using Internet Key Exchange (IKE) authentication.

4. The method of claim 3, further comprising identifying a failure to establish a new cloud-based Security Association (SA) using tunnel configuration provided by the cloud service before expiration of a current key associated with the encrypted tunnel.

5. The method of claim 1, The method of claim 1, further comprising:
   determining the loss of connectivity to the cloud service by identifying failed attempts to re-establish a connection between the initiator device and the cloud service or the responder device and the cloud service; and
   establishing, by the initiator device using the set of parameters of the encrypted tunnel, the survivability tunnel between the initiator device and the responder device bypassing the network.

6. The method of claim 1, wherein establishing the survivability tunnel further comprises:
   creating a legacy encrypted tunnel using the set of parameters bypassing the network; and
   authenticating the responder device using certificate-based authentication.

7. The method of claim 1, further comprising forwarding traffic from the initiator device to the responder device via the survivability tunnel.

8. The method of claim 1, further comprising:
   determining whether the connectivity to the cloud service is re-established; and
   in response to determining that the connectivity to the cloud service is re-established, switching from the survivability tunnel to the encrypted tunnel for communication between the initiator device and the responder device.

9. The method of claim 1, further comprising:
   in response to determining that the survivability tunnel is not successfully established, performing an additional attempt to establish the survivability tunnel.

10. A computer system, comprising:
a processor;
a memory device;
a non-transitory computer-readable storage medium storing instructions, which when executed by the processor cause the processor to:
operate as a first networking device associated with a cloud service;
establish an encrypted tunnel between the first networking device and a second networking device associated with the cloud service based on a set of parameters obtained from the cloud service;
determine whether there is a loss of connectivity to the cloud service from the first or second networking device, wherein the cloud service supports respective communication links to the first and second networking devices via a network associated with the cloud service;
in response to determining the loss of connectivity due to not receiving a response from the cloud service for a message sent from the first networking device or the second networking device for a rekeying of the encrypted tunnel, establish, using the set of parameters, a survivability tunnel between the first and second networking devices bypassing the network; and
in response to determining that the survivability tunnel is successfully established, communicatively couple the first networking device and the second networking device via the survivability tunnel as a failsafe to the encrypted tunnel.

11. The computer system of claim 10, wherein the set of parameters is received from a tunnel orchestration of the cloud service.

12. The computer system of claim 10, wherein the survivability tunnel comprises a legacy Internet Protocol Security (IPsec) tunnel established using Internet Key Exchange (IKE) authentication.

13. The computer system of claim 12, wherein establishing the survivability tunnel further comprises:
creating a legacy encrypted tunnel using the set of parameters received from the cloud service bypassing the network; and
authenticating the second networking device using certificate-based authentication.

14. The computer system of claim 10, wherein the first or second networking device comprises at least one of: a gateway, a branch gateway, a virtual private network (VPN) concentrator, a switch, a firewall device, a server, and a workstation.

15. A non-transitory computer-readable storage medium having executable instructions stored thereon that, when executed by a processor, perform operations of:
establishing an encrypted tunnel between an initiator device and a responder device of a cloud service based on a set of parameters obtained from the cloud service;
determining whether there is a loss of connectivity to the cloud service from an initiator device or a responder device, wherein the cloud service supports respective communication links to the initiator device and the responder device via a network associated with the cloud service;
in response to determining the loss of connectivity due to not receiving a response from the cloud service for a message sent from the initiator device or the responder device for a rekeying of the encrypted tunnel, establishing, using the set of parameters, a survivability tunnel, between the initiator device and the responder device bypassing the network; and
in response to determining that the survivability tunnel is successfully established, communicatively coupling the initiator device and the responder device via the survivability tunnel as a failsafe to the encrypted tunnel.

16. The non-transitory computer-readable storage medium of claim 15, wherein the operations further comprise:
determining the loss of connectivity to the cloud service by identifying failed attempts to re-establish a connection between the initiator device and the cloud service or the responder device and the cloud service; and
establishing, by the initiator device using the set of parameters of the encrypted tunnel, the survivability tunnel between the initiator device and the responder device bypassing the network.

17. The non-transitory computer-readable storage medium of claim 16, wherein the operations further comprise identifying a failure to establish a new cloud-based Security Association (SA) using tunnel configuration provided by the cloud service before expiration of a current key associated with the encrypted tunnel.

18. The non-transitory computer-readable storage medium of claim 15, wherein the survivability tunnel comprises a legacy Internet Protocol Security (IPsec) tunnel established using Internet Key Exchange (IKE) authentication.

19. The non-transitory computer-readable storage medium of claim 15, wherein establishing the survivability tunnel further comprises:
creating a legacy encrypted tunnel using the set of parameters received from the cloud service bypassing the network; and
authenticating the responder device using certificate-based authentication.

20. The non-transitory computer-readable storage medium of claim 15, wherein the operations further comprise:
determining whether the connectivity to the cloud service is re-established; and
in response to determining that the connectivity to the cloud service is re-established, switching from the survivability tunnel to the encrypted tunnel for communication between the initiator device and the responder device.

* * * * *